May 19, 1931.  A. CALLSEN  1,806,331
INDUCTION METER
Filed March 15, 1928
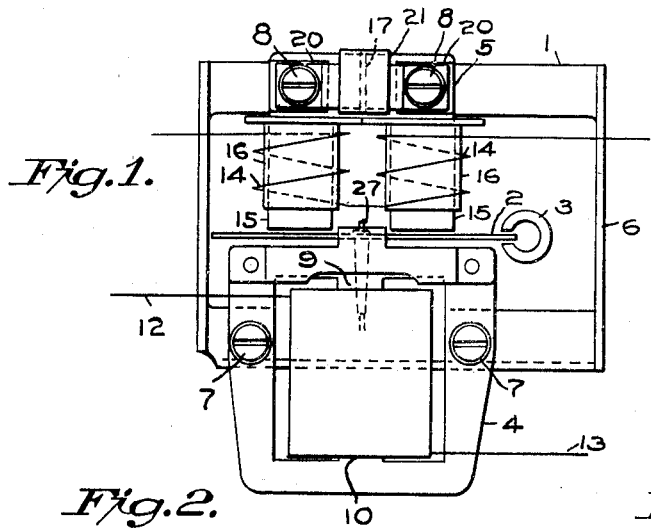
Fig.1.
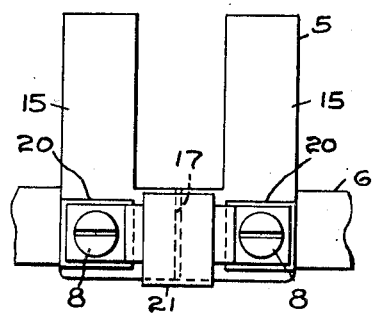
Fig.2.
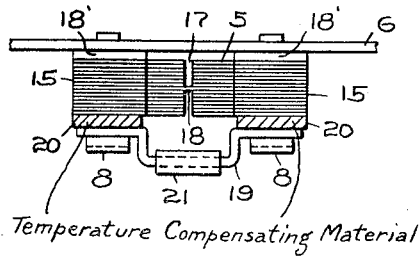
Fig.3.
Temperature Compensating Material
Fig.4.
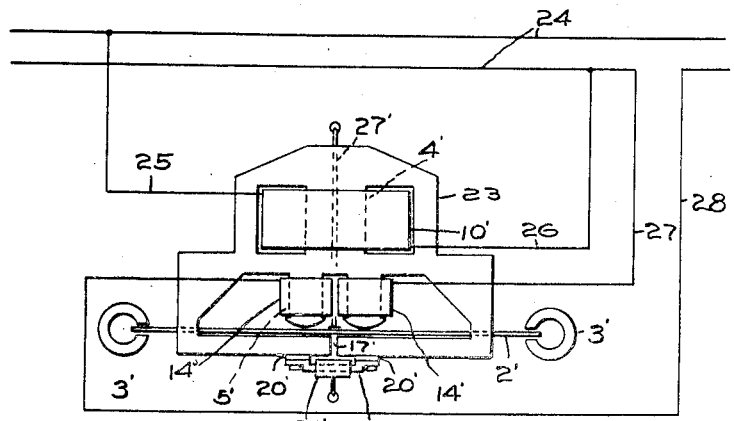
Fig.5.
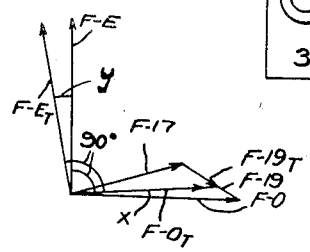
INVENTOR
Albert Callsen
BY
Wesley J. Carr
ATTORNEY Patented May 19, 1931

1,806,331

UNITED STATES PATENT OFFICE

ALBERT CALLSEN, OF NUREMBERG, GERMANY, ASSIGNOR TO WESTINGHOUSE ELECTRIC & MANUFACTURING COMPANY, A CORPORATION OF PENNSYLVANIA

INDUCTION METER

Application filed March 15, 1928, Serial No. 261,895, and in Germany April 4, 1927.

My invention relates to alternating-current electrical apparatus and more particularly to the class of such apparatus involving the use of devices known as inductance coils.

My invention has for its object to provide means whereby the action of inductance coils may be automatically regulated or controlled to compensate for changes due to variations of temperature in the apparatus with which they are employed.

My invention is particularly adapted for use in connection with alternating-current measuring instruments such, for example, as alternating-current watthour meters and ampere-hour meters that operate on the induction principle.

In the operation of such measuring instruments as those above referred to, the reading or indication is liable to be affected by changes in temperature and it, therefore, becomes desirable to provide such means of regulation and adjustment as will insure a correct indication, irrespective of the temperature at that particular time.

It is the object of my present invention to compensate, in the apparatus, undue changes in temperature by producing an effect which shall be opposed to the variations above referred to, so that the resulting indication will be practically independent of changes in temperature.

The effect of temperature on wattmeter indications is produced in various ways. One is the change of resistance of the electrical circuits and the change of permeability of the magnetic circuits with variations of temperature. A second is the change of friction with a change of temperature. Both of these changes combine to cause the wattmeter to indicate higher than the correct indication with an increase in temperature, and, conversely, lower than the correct indication with a decrease in temperature.

Similarly, induction watthour meters for integrating energy on low-power-factor circuits, as ordinarily constructed, are also open to errors due to changes in temperature.

Some of the errors arising from temperature fluctuations are due to change in the phase relation of the current and pressure fields threading the armature.

My invention has for another object to provide means for automatically maintaining the phase relation of the current and pressure fields constant, regardless of changes in temperature.

In accordance with my invention, at least a portion of the flux path of the voltage or the series magnet system is divided into parallel paths of which one contains a temperature alloy and is loaded with a secondary winding; for example, a short-circuited ring.

It is particularly advantageous to effect the branching of the flux in one of the main flux circuits. Therefore, in accordance with my invention, the series-current magnet is provided with an air gap that is bridged by a flux path consisting partly of temperature alloy and loaded with a secondary winding. Such arrangement causes the meter to register correctly, regardless of temperature variations, in a manner that will be more fully set forth hereinafter.

My invention may be more readily comprehended if the accompanying drawings are referred to in connection with the following description.

In the drawings,

Figure 1 is a view, in elevation, of a watthour meter constructed in accordance with my invention.

Fig. 2 is a view, in elevation, of the series-current-magnet system shown in Fig. 1 and embodying my invention.

Fig. 3 is a view, in plan, of the series-current-magnet system shown in Fig. 2.

Fig. 4 is a view, in elevation, of a portion of a watthour meter of another type constructed in accordance with my invention, and Fig. 5 is a vector diagram for explaining the way the compensating devices correct for changes in the phase angle of the voltage flux upon changes of temperature.

Referring to the drawing, a watthour meter 1 comprises an armature 2 that is preferably in the form of a disc and consists of a conducting material, such as copper or aluminum. The motion of the disc 2 is restrained by a damping magnet 3, shown in the conventional form of a permanent magnet of substantially C-shape. The armature 2 is disposed in an air gap between a laminated voltage core 4 and a laminated current core 5 that are suitably mounted on a frame 6 that preferably comprises a non-magnetic material. The series-current core 5 and the voltage core 4 are similarly fastened to the frame 6 by bolts 7 and 8, respectively.

The voltage core 4 is provided with a central core 9 on which is disposed a coil 10 having a large number of turns of fine wire, whereby a high inductive effect may be obtained. The inductance of the coil 10 is preferably of such magnitude that the current therethrough lags behind the voltage impressed on its terminals 12 and 13 by substantially 90°.

The current core 5 comprises a structure of substantially U-shape that is provided with windings 14 that are preferably insulated from the members 15 by means of members 16 of cardboard, or the like. The windings 14 preferably comprise a relatively small number of turns of heavy wire.

The coils 14 are preferably connected, in series-circuit relation, to a circuit the power of which is to be measured, and the voltage coil 10 is connected in parallel circuit relation thereto. The cooperation of the fluxes produced by the windings 10 and 14 in the current core 5 and the voltage core 4 produce a turning torque on the armature 2, which is mounted on a spindle 27 that drives an indicating or a registering train (not shown) in the usual manner.

As hereinbefore mentioned, an increase in temperature affects the registration of the meter 1, in general, by causing the armature 2 to rotate at a faster rate than is indicative of the energy being metered. I propose to compensate the meter 1 for temperature variations in the following manner.

I divide the current core 5 into two sections that are separated by an air gap 17. The two members 15 are of substantially L-shape and are connected by a plate 18 that preferably comprises a material of poor magnetic conductivity. The two members 15 are attached to the frame 6 on the meter by means of the bolts 8 that extend through brass washers 18' interposed between the sections 15 and the frame 6. A bridging member 19, preferably of magnetizable material, such as iron, is mounted on the members 15 by means of the bolts 8. The member 19 is separated from the members 15 by the interposition of discs 20 that comprises a material of temperature alloy having a high negative temperature coefficient of permeability. The member 19 is provided with a closed circuit ring 21 for the purpose of causing the flux traversing the member 19 to lag an appreciable angle behind the flux traversing the air gap 17.

When the temperature rises, the permanent magnet 3 decreases its braking effect, in accordance with well-known laws, tending to cause the armature 2 to run faster. An increase of temperature also decreases the permeability of the temperature alloy members 20, whereby the magnetic resistance of the flux path 19 is increased, and fewer lines of force are formed in the series magnet core 5, thus reducing the torque affecting the armature 2. In this manner, the reduction in braking, due to the damping magnet 3, is compensated.

In addition to the above, when the temperature rises, the ohmic resistance of the voltage winding 10 increases, causing the phase angle between the voltage flux and the voltage to become smaller. The vector of the voltage flux is somewhat advanced in phase by the increase in temperature. In accordance with my invention, this error is compensated by a corresponding advance in the current flux relative to the main current, in the following manner.

Owing to the transformer effect of the closed circuit ring 21, the flux F—19, see Fig. 5, traversing the path 19 lags behind the flux F—17 traversing the air gap 17. Due to the increase in temperature, the temperature alloy members 20 decrease the magnitude of flux F—19 traversing the path 19, to a new value of flux F—19T, while the magnitude of the flux F—17 traversing the air gap 17 remains substantially unchanged. Since the output flux F—0 is that which traverses the armature 2, the effect of the increase in temperature is to advance the phase angle of such output flux F—0$_T$ by an amount X since it is equal to the vectorial sum of the flux F—19 traversing the path 19 and the flux F—17 traversing the air gap 17. A reduction in the magnitude of flux F—19 traversing the path 19 causes the output flux F—0 to advance in angular phase displacement to F—0$_T$ which compensates for the above-mentioned advance y in the voltage flux F—E to F—E$_T$.

Referring to Fig. 4, my invention is shown embodied in a watthour meter having a different core construction from that described in connection with the meter shown in Fig. 1. In Fig. 4 the current and voltage cores 5' and 4' are combined in a single laminated core structure 23. In this case, a convenient location of the magnetizable bridge 19' is in a path traversed by the flux emanating from the current coils 14'. In Fig. 4, the voltage coil 10' is connected in parallel-circuit relation to a circuit 24 by means of conductors 25 and 26, and the current windings 14' are connected in series-circuit relation to the circuit 24 by conductors 27 and 28. The operation of the member shown in Fig. 4 is similar to that described in connection with Fig. 1.

It will be understood that, while a preferred form of my invention comprises the use of a soft-iron magnetizable member 19 and the temperature alloy members 20, the member 19 itself may be made of temperature alloy or only one of the members 20 may be made of temperature alloy without affecting the operation of my invention.

Various similar changes may be made in my invention without departing from the spirit or scope thereof, as set forth in the appended claims.

I claim as my invention:

1. An inductance coil provided with a core having an air gap, means including a member of a material having a negative temperature coefficient of permeability shunting said air gap, and a closed-circuit winding encircling said member.

2. A magnetic core including materials forming a main flux path and an auxiliary flux path, the temperature coefficient of permeability of the material of said main path differing from the temperature coefficient of permeability of the material of said auxiliary path, and a closed-circuit winding embracing one of said flux paths.

3. In combination with a magnetic core, a coil for said core and means for causing an alternating current to traverse said coil, whereby an alternating flux flows in said core, of means for affecting the phase displacement and magnitude of said flux in accordance with changes of temperature comprising an air gap in said core, a member of magnetizable material bridging said gap, and a winding embracing said member.

4. A core for the series winding of an induction meter including a plurality of members of substantially L-shape separated by an air gap, an iron piece bridging the air gap, spacers of a material having a permeability responsive to temperature changes disposed between said iron piece and said core, and a ring of conducting material encircling said iron piece.

5. A core for the series winding of an induction meter including a plurality of laminated sections separated by a gap having a permeability substantially equal to that of air, a member of magnetizable material bridging said gap, said material having a pronounced temperature coefficient of permeability, and a conductor encircling said member.

6. An induction meter having an armature, a core comprising means for producing fluxes through said armature at approximately a predetermined degree of phase displacement with respect to each other, said phase displacement being affected by temperature changes, of means for maintaining said phase displacement constant, regardless of temperature changes comprising an air gap in said core, a magnetizable member bridging said gap, and a winding encircling said member.

7. In an electricity meter, the combination with a movable element, a main core for said element, and windings cooperating with said core to produce a torque for driving the movable element, the speed of which tends to change in accordance with temperature changes, of an auxiliary core including a material having a negative temperature coefficient of permeability, means including an air gap in said main core coacting with said auxiliary core, and a closed-circuit winding embracing said auxiliary core whereby said tendencies to change in speed of the movable element are counteracted by corresponding changes in the torque produced by said windings.

8. An induction meter comprising series and voltage cores, one of said cores including a plurality of flux path members, a temperature alloy of magnetizable material constituting one of said members, and a secondary winding for one member.

9. An induction meter comprising series and voltage cores, said series core having an air gap therein, and a magnetizable yoke bridging said air gap, said yoke including a temperature responsive magnetizable member, and a winding on said yoke.

10. A core for an induction meter, said core having a gap therein, a magnetizable member for completely bridging said gap, means associated with said member for rendering the magnetic circuit through said member responsive to temperature changes, and means associated with said magnetizable member for lagging the flux therein.

11. A core for an induction meter, said core having a gap therein, a magnetizable member associated with said gap, a spacer of magnetizable material, the temperature coefficient of permeability of which is different from that of said core, disposed between said member and said core and a winding of conducting material associated with said member.

12. A core for an induction meter, said core having a gap of low permeability therein, a magnetizable member bridging said gap, a ring of conducting material encircling said member, and a spacer of magnetizable material, the temperature coefficient of permeability of which is different from that of said core, associated with said magnetizable member.

13. A laminated core of magnetizable material of substantially U-shape, having an air gap in its base between the side members thereof, a shunt member of magnetizable material bridging said air gap, and only one lag loop embracing said shunt member.

14. In an induction meter, the combination with an armature of conducting material, means for rotating said armature including current and voltage coacting flux producing windings, a magnetizable core for said windings, and means for damping said armature, said armature being inherently affected to operate erroneously at temperatures other than the temperature at which it is calibrated, of means for correcting said temperature errors including an air gap in said current core, a magnetizable member completely bridging said air gap, and a short-circuit winding embracing said shunt member, said air gap, bridging member and winding coacting to properly change the phase position and magnitude of the current flux to compensate said armature for temperature errors.

15. In combination with a magnetic core, a coil for said core and means for causing an alternating current to traverse said core, whereby an alternating flux flows in said core, of means for affecting the phase displacement and magnitude of said flux in accordance with changes of temperature comprising an air gap in said core, a member for bridging said air gap, the temperature coefficient of permeability of which is different from that of said core, and a winding embracing said member.

16. A core for the series winding of an induction meter including a plurality of members of substantially L-shape separated by an air gap, an iron piece bridging the air gap, spacers disposed between said iron piece and said core, the material of which has a permeability responsive to temperature changes which is different from that of said core, and a ring of conducting material encircling said iron piece.

17. A core for the series winding of an induction meter including a plurality of laminated sections separated by a gap having a permeability substantially equal to that of air, a member of magnetizable material for bridging said gap, said material having a temperature coefficient of permeability which is different from that of said core, and a conductor encircling said member.

18. An induction meter comprising series and voltage cores, said series core having an air gap therein, and a magnetizable yoke for bridging said air gap, said yoke including a magnetizable member having a temperature coefficient of permeability which is different from that of said series core.

19. A laminated core of magnetizable material of substantially U-shape having an air gap in its base between the side members thereof, a shunt member of magnetizable material for bridging said air gap, said member having a temperature coefficient of permeability which is different from that of said core, and a lag loop embracing said shunt member.

In testimony whereof, I have hereunto subscribed my name this 27th day of January, 1928.

ALBERT CALLSEN.